2,637,823

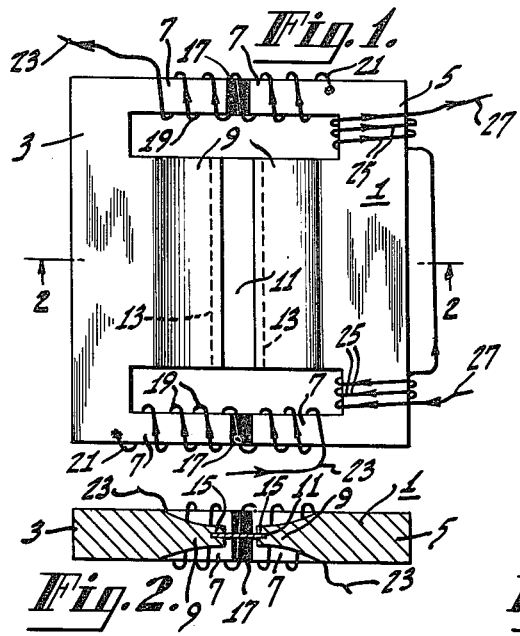
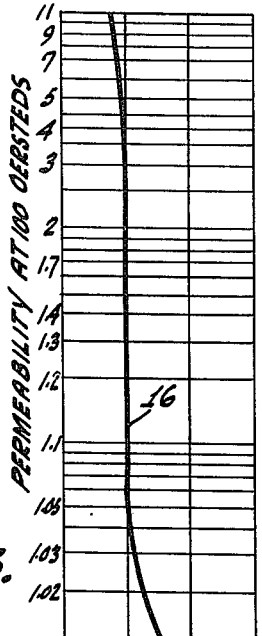
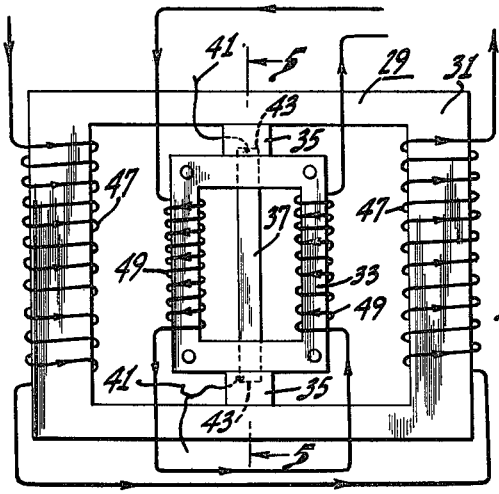
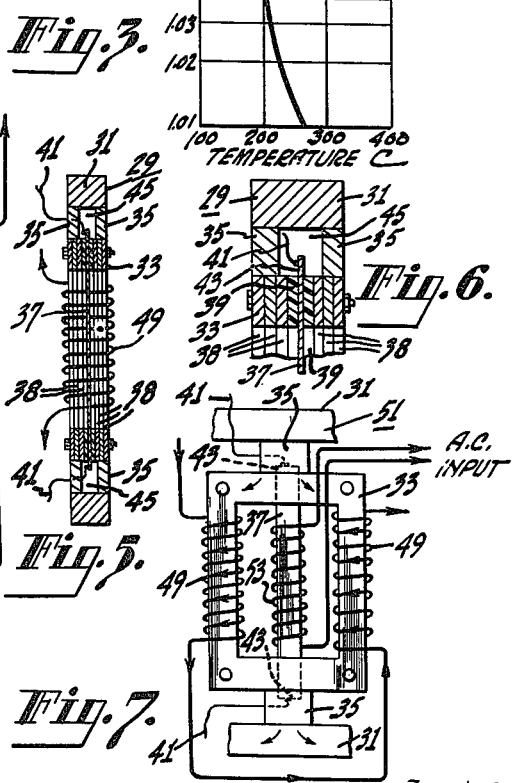
Inventors
LESLIE J. ANDERSON &
MONES E. HAWLEY Patented May 5, 1953

UNITED STATES PATENT OFFICE 2,637,823

THERMOMAGNETIC TRANSDUCER

Leslie J. Anderson, Moorestown, and Mones E. Hawley, Collingswood, N. J., assignors to Radio Corporation of America, a corporation of Delaware Application December 30, 1949, Serial No. 136,102

17 Claims. (Cl. 310—4)

Our present invention relates to magnetic transducers, and more particularly to magnetic transducers the operation of which depends upon a temperature sensitive element.

It is well known that the magnetic characteristics of certain temperature sensitive alloys will vary in accordance with changes of temperature. Use of these alloys in certain types of magnetic instruments, such has transducers, or the like, will be found to have particular application in cases where an instrument is subjected to rough handling or other rugged conditions. For example, in certain military operations, sound translating devices are employed in ranging apparatus for determining the position of a gun. Under such conditions, the conventional microphone is not found to be practical because of its high sensitivity to mechanical disturbances. Successful attempts have been made to overcome many of the difficulties encountered under such conditions by instruments which use an electrically heated, thin, wire conductor, also known as a "hot wire" element, wherein the resistance of the wire changes in response to changes in its temperature. However, difficulties are also encountered with such devices because the wire element is subject to breaking easily.

The primary object of our present invention is to provide a thermomagnetic transducer which will overcome the above, as well as other, disadvantages of prior art transducers.

It is also an object of our present invention to provide a thermomagnetic transducer which is extremely rugged in structure, yet highly efficient.

Another object of our present invention is to provide an improved transducer which will readily adapt itself to extreme rugged conditions, such as those encountered in many military operations.

Still another object of our present invention is to provide a thermomagnetic transducer which will use to advantage the magnetic characteristics of certain temperature sensitive materials in the magnet circuit of a transducer.

A further object of our present invention is to provide a thermomagnetic transducer which is simple and easy to construct at a minimum of cost and which is very efficient in use.

In accordance with our present invention, we provide a transducer which comprises a magnetic field structure having a thin strip of temperature sensitive material as part of the magnetic circuit thereof to vary the reluctance of the magnetic structure in response to temperature variations in the material. The temperature sensitive material is heated to a critical temperature at which the material responds most efficiently to produce large changes in its magnetic permeability as a consequence of small changes in temperature. Windings are inductively coupled with the magnetic structure either to detect changes in its reluctance as a result of changes in temperature of the temperature sensitive material produced, for example, by sound wave pressure on the material, or for introducing variations in flux density in the magnetic circuit to alter the permeability of the material and consequently vary the temperature thereof in order to produce corresponding differences in pressure of the air adjacent to the material such that the instrument will function as an acoustical radiator.

The novel features of our present invention, as well as additional features and advantages thereof, will be understood better from the following detailed description of three embodiments of our invention, when read in connection with the accompanying drawing in which, Figure 1 is a front elevation of a thermomagnetic transducer in accordance with one embodiment of our present invention, Figure 2 is a sectional view taken along the line 2—2 of Figure 1, Figure 3 is a curve of a preferred type of thermomagnetic material showing the permeability thereof as a function of its temperature, Figure 4 is a front elevation of a second embodiment of thermomagnetic transducer in accordance with our present invention, Figure 5 is a sectional view taken along the line 5—5 of Figure 4, Figure 6 is a fragmentary, enlarged view of a portion of the apparatus shown in Figure 5, and Figure 7 is a view of a portion of the transducer shown in Figure 4 modified in accordance with a third embodiment of our present invention.

It is well known that certain alloys can be made of nickel, iron, chromium and copper which will exhibit critical changes in magnetic properties when heated to a critical temperature. If a thin strip of such a material is heated to its critical temperature, preferably above the ambient temperature, by a considerable amount, and then subjected to temperature variations, the permeability of the material will vary accordingly. If such a material is introduced into a magnetic circuit, and the material is operated at a temperature just below the Curie point (that is, the point at which the permeability of the material approaches unity), variations in flux density in the magnetic field structure will result from temperature changes in the material and an output voltage may be obtained by linking the flux path with a suitable coil or winding. Such a material will be found to have particular application in certain types of transducers which may be employed either as sound translating devices or as amplifiers.

Referring more particularly to the drawing, wherein similar reference characters designate corresponding parts throughout, the transducer 1, shown in Figures 1 and 2, comprises a magnetic field structure having two E-shaped magnetic core pieces 3, 5, of a material which has a substantially constant magnetic permeability regardless of its changes in temperature. The core pieces 3, 5 are disposed in the same plane with their free end portions or extensions 7 and their intermediate portions or extensions 9 extending toward each other. The intermediate extensions 9 are connected by an elongated, thin strip of temperature sensitive, magnetic material 11 which is attached to the extensions 9 along its longitudinal edges 13 by any suitable means which will provide a low reluctance path between the core pieces 3, 5 and the thermomagnetic strip 11. As shown particularly in Figure 2, the strip of material 11 has the longitudinal edges 13 thereof tightly secured in slots 15 provided in the free ends of the intermediate extensions 9.

The temperature sensitive material 11, also referred to herein as a thermomagnetic element or material, should be preferably one in which a relatively small unit change in temperature will produce a relatively great change in its magnetic permeability. For example, an alloy which comprises 85% nickel and 15% copper will be found suitable for the purpose of our present invention. The permeability of this alloy as a function of its temperature in the range around 200° C. is shown by the curve 16 in Figure 3 of the drawing. It will be observed from this curve that, for a relatively small change in temperature as between points slightly below and above 200° C., the permeability of this alloy changes a considerable amount from approximately 1.04 to 4.50.

The adjacent, free, end extensions 7 of the respective core pieces 3, 5 are disposed apart a distance such that the air gaps between them will not only prevent short circuiting of the electrical heating circuit, to be described below, but will also have a relatively low reluctance as compared to that of the strip of thermomagnetic material 11. If necessary, blocks of insulating material 17 may be disposed in the air gaps and secured between the ends 7 to provide a more rigid structure.

Separate coils or windings 19 are inductively coupled with the magnetic field structure for supplying an exciting field, these being disposed individually about adjacent end extensions 7 at opposite ends thereof. Each coil 19 has an end 21 thereof connected to a separate core piece 3, 5 so that the coils are connected in series through the core pieces 3, 5 and the strip of thermomagnetic material 11. The opposite ends 23 of the coils 19 are freely disposed for connection with a suitable source of direct current so that the same current provides the exciting field for the structure as well as the necessary heating current to elevate the temperature of the thermomagnetic material 11 to its critical temperature. In order to prevent excess heat conduction away from the thermomagnetic material 11, and also to avoid saturation of the core pieces 3, 5, at portions thereof remote from the thermomagnetic material, the intermediate extensions 9 are made relatively thin or tapered toward their free ends, as shown in Figure 2 of the drawing.

Another pair of coils or windings 25, which are also connected in series, are inductively coupled with the magnetic field structure, being shown in Figure 1 disposed about portions of the core piece 5 between the end extensions 7 and the intermediate extensions 9. The purpose of the windings 25 is either (1) to detect (a) variations of reluctance in the magnetic structure or (b) variations of permeability in the temperature sensitive material 11 which result from temperature changes in the material, or (2) to introduce variations in flux density in the magnetic circuit in order to vary the permeability of the temperature sensitive material and thereby modulate its temperature to produce pressure differences in the ambient air adjacent to the temperature sensitive material. In the former case, the transducer 1 may be utilized as a microphone operating on the well known principle that temperature varies with changes in pressure. Thus, when sound waves impinge on the thermomagnetic material 11, the ambient air pressure on the material will rise and fall once in each half cycle of the sound wave. Since the temperature of the material responds significantly to these pressure variations, particularly at the region of the Curie point, the permeability of that material will also vary with the result that the flux density in the magnetic field structure will vary accordingly and an output voltage may be obtained from the terminal leads 27 of the coils 25. In the second case, the transducer 1 operates in the reverse manner. Here, a signal voltage supplied to the coils 25 will vary the flux density in the magnetic circuit causing the permeability of the thermomagnetic material 11, and hence the temperature thereof, to be altered. Thus, the temperature of the air immediately surrounding the material will be varied in response to each half cycle of current in the coils 25 and the resulting expansions and contractions of the air will be detected as sound waves.

A second embodiment of our present invention, illustrated in Figures 4 through 6 of the drawing, comprises a transducer 29 having outer and inner magnetic frame members 31, 33. The inner magnetic frame member 33 is disposed in spaced relation to and within the outer frame member 31, with both frame members lying in substantially a common plane. Magnetic flux conducting spacing members 35 secure the frame members 31, 33 in their relative positions from opposite points on each of the frame members. Thus, the inner frame member 33 and the spacing members 35 provide a flux path across opposite frame portions of the outer frame member 31. The outer frame 31 may be made from core material similar to the core pieces 3, 5 of the transducer 1, shown in Figure 1 of the drawing, thereby to provide an exciting field structure having substantially uniform permeability regardless of its temperature changes. The inner frame member 33 is preferably a laminated structure in order to improve the efficiency of the magnetic circuit for any alternating current flux.

A strip of thermomagnetic material 37 is disposed across opposite frame portions of the inner frame member 33 to provide a magnetic shunt across the inner frame member. The member 33 is supported at opposite ends thereof between the laminations 38 and insulated therefrom by thin insulators or separators 39 of suitable material, such as mica, in order to prevent short circuiting of the heater current for heating the thermomagnetic material 37 to its critical temperature. The heating current is applied through leads 41 attached to opposite ends 43 of the thermomagnetic material 37. The ends 43 of the thermomagnetic material are extended beyond the outer edges of the inner frame member 33 into a space 45 between two spaced-apart spacing members 35 in order to provide a suitable connection for the leads 41, as best seen in Figure 6 of the drawing.

Coils or windings 47 are inductively coupled with opposite end portions of the outer frame member 31 for supplying an exciting field for the magnetic structure. Other coils or windings 49 are inductively coupled with opposite end portions of the inner frame member 33, the purpose of the windings 49 being similar to that of the windings 25 of the transducer 1 shown in Figure 1. The transducer 29 operates in a manner similar to the transducer 1 and may also be utilized either as a microphone to pick up and translate sound wave energy into electrical energy or as an acoustical radiator to translate electrical energy into sound wave energy.

The transducer 51, in accordance with a third embodiment of our invention, is similar in structure to the transducer 29 shown in Figure 4 of the drawing with the exception that a third winding or coil 53 is inductively coupled with the thermomagnetic material 37. The purpose of the winding 53 is to vary the elevated temperature of the thermomagnetic material 37 and cause corresponding changes in the flux density in the magnetic field structure. For the purpose of illustration, the temperature varying element has been shown as an inductively coupled winding 53 disposed about the thermomagnetic material 37. It will, of course, be obvious to those persons skilled in the art that the temperature of the material 37 may be varied in many ways, as by changing the flow of electric current through the coils 53, by changing the frequency of the current flowing through the coils 53, or in other suitable ways. Thus, the transducer 51 will be effective as an amplifier inasmuch as large values of output will be obtained from the coils 49 by introducing small values of input in the coils 53. Thus, we have provided an amplifier which is simple to construct and which is not too unwieldy or heavy for use where portable equipment is required.

It will be apparent from the foregoing description that we have provided an efficient, rugged, transducer which is particularly useful either to convert sound wave energy into electrical energy, or electrical energy into sound wave energy, and which also may be employed as a simple, efficient amplifier. Although we have shown and described three separate embodiments of our present invention, it will be recognized by those persons skilled in the art that other embodiments and changes are possible within the spirit of our invention. Therefore, we desire that the foregoing description shall be considered as illustrative and not as limiting.

What is claimed is:

1. An electro-acoustical transducer for translating audio signals comprising a magnetic field structure including at least two elements, one of said elements being constituted of a thermomagnetic material which exhibits changes in temperature in response to sound pressure waves impinging thereon, means for heating said thermomagnetic element to substantially the Curie temperature thereof, means including said thermomagnetic element for varying the reluctance of said field structure in accordance with sound waves impinging upon said thermomagnetic element, and means to detect said reluctance variations.

2. A transducer according to claim 1 wherein said detecting means comprises a winding inductively coupled with said magnetic field structure.

3. A transducer comprising a magnetic field structure including at least two elements, one of said elements comprising a thermomagnetic element, said thermomagnetic element being constituted of a material which exhibits relatively greater changes in magnetic permeability within a predetermined range of temperatures than the other of said elements, means for heating said thermomagnetic element to substantially the Curie temperature thereof, and means for varying the density of magnetic flux in said magnetic field structure to vary the permeability of said thermomagnetic element and modulate the temperature thereof.

4. A transducer according to claim 3 wherein said means for varying the density of magnetic flux comprises windings inductively coupled with said magnetic field structure.

5. An electro-acoustical transducer comprising inner and outer magnetic frames, said inner magnetic frame being disposed in spaced relation to and within said outer magnetic frame, magnetic conductor means connecting said inner and outer magnetic frames at opposite points disposed respectively on each of said frames, said inner frame providing a flux conducting path across opposite frame portions of said outer frame, thermomagnetic means disposed across said inner frame at two oppositely disposed points to provide a magnetic shunt across said inner frame, means coupled with said outer frame for supplying an exciting field, and means coacting with said inner frame and being responsive to variations in flux density in said inner magnetic frame in consequence of reluctance variations in said magnetic frames produced as a result of permeability changes in said thermomagnetic means.

6. A transducer according to claim 5 characterized in that heating means is provided for elevating said thermomagnetic means to substantially a critical temperature.

7. A transducer according to claim 5 characterized in that said thermomagnetic means is provided with means for modulating the temperature thereof to produce said reluctance variations.

8. A transducer according to claim 7 wherein said temperature modulating means comprises a winding inductively coupled with said thermomagnetic means for varying the temperature thereof, thereby to produce variations in intensity of magnetic flux through said inner magnetic frame.

9. An electro-acoustical transducer comprising inner and outer magnetic frames, said inner magnetic frame being disposed in spaced relation to and within said outer magnetic frame, magnetic flux conducting means connecting said inner and outer magnetic frames at opposite points disposed respectively on each of said frames, said inner frame providing a magnetic flux conducting path across opposite frame portions of said outer frame, thermomagnetic means disposed across said inner frame at two oppositely disposed points to provide a magnetic shunt across said inner frame, means for supplying a magnetizing force to said outer magnetic frame, and means inductively coupled with said inner magnetic frame for varying the flux density therein to alter the permeability of said thermomagnetic means, thereby to change the temperature thereof.

10. An electro-acoustical transducer for translating audio signals comprising a magnetic field structure having two end portions and an intermediate portion, said intermediate portion including thermomagnetic means to vary the reluctance thereof in response to the applied audio signals, said thermomagnetic means comprising an element which exhibits relatively greater changes in magnetic permeability within a predetermined range of temperatures than said end portions, and means coacting with said magnetic field structure to detect said reluctance variations.

11. A transducer according to claim 10 wherein said magnetic field structure is provided with means for heating said thermomagnetic means to substantially the Curie temperature thereof.

12. A transducer according to claim 10 wherein said magnetic field structure is provided with a field coil for energizing said magnet field structure.

13. A transducer according to claim 12 wherein said field coil also provides a source of energy for elevating said thermomagnetic means to substantially the Curie temperature thereof.

14. A transducer according to claim 13 wherein said means for detecting permeability variations comprises a winding inductively coupled with said magnetic field structure.

15. An electro-acoustical transducer for translating audio signals comprising a magnetic field structure including at least two elements, one of said elements being constituted of a thermomagnetic material, means for heating said thermomagnetic element to substantially the Curie temperature thereof, and means for varying the temperature of said thermomagnetic element in accordance with the applied audio signals.

16. The invention as set forth in claim 15 wherein said means for varying the temperature of said thermomagnetic element includes means for varying the magnetic flux density thereof.

17. The invention as set forth in claim 15 wherein said thermomagnetic element comprises a strip of thermomagnetic material, which is relatively small in one direction of its cross-sectional area.

LESLIE J. ANDERSON.
MONES E. HAWLEY.

References Cited in the file of this patent
UNITED STATES PATENTS

| Number | Name | Date |
|---|---|---|
| 407,762 | Acheson | July 30, 1889 |
| 422,295 | Cooper | Feb. 25, 1890 |
| 1,406,576 | Murray | Feb. 14, 1922 |
| 2,510,800 | Chilowsky | June 6, 1950 |